US012531909B2

(12) United States Patent
Duijm

(10) Patent No.: US 12,531,909 B2
(45) Date of Patent: Jan. 20, 2026

(54) LOCAL BROWSER ISOLATION WITH VIDEO STREAMING TO PREVENT MALICIOUS ATTACKS

(71) Applicant: Fortinet, Inc., Sunnyvale, CA (US)

(72) Inventor: Martijn Duijm, Ede (NL)

(73) Assignee: Fortinet, Inc., Sunnyvale, CA (US)

( * ) Notice: Subject to any disclaimer, the term of this patent is extended or adjusted under 35 U.S.C. 154(b) by 58 days.

(21) Appl. No.: 18/216,816

(22) Filed: Jun. 30, 2023

(65) Prior Publication Data

US 2025/0007953 A1 Jan. 2, 2025

(51) Int. Cl.
*H04L 9/40* (2022.01)
*G06F 9/455* (2018.01)

(52) U.S. Cl.
CPC .......... *H04L 63/20* (2013.01); *G06F 9/45558* (2013.01); *H04L 63/1441* (2013.01); *G06F 2009/45587* (2013.01); *G06F 2009/45595* (2013.01)

(58) Field of Classification Search
CPC . H04L 63/20; H04L 63/0227; H04L 63/1441; H04L 9/002; G06F 9/45558; G06F 2009/45595; G06F 2009/45587
See application file for complete search history.

(56) References Cited

U.S. PATENT DOCUMENTS

| 2014/0195675 | A1* | 7/2014 | Silver | H04L 65/612 709/224 |
| 2019/0121961 | A1* | 4/2019 | Coleman | H04L 63/0227 |
| 2023/0230085 | A1* | 7/2023 | Turgeman | G06Q 20/10 |
| 2024/0004948 | A1* | 1/2024 | Largo Del Amo | H04L 67/56 |

* cited by examiner

*Primary Examiner* — Frantz B Jean
(74) *Attorney, Agent, or Firm* — Law Office of Dorian Cartwright; Dorian Cartwright

(57) ABSTRACT

A web page is fetched from the data communication network and load to the virtual machine of a web browser app running in a web browser. The web page continuously renders the web page in the virtual machine of the web browser app according to the configured security policies. A virtual screenshot module to continuously take virtual screenshots of the web page rendering, from the web browser app. Interactive objects are identified on the rendered web page, and replica interactive objects generated to overlay the virtual screenshot to allow user interactions with the screenshot in the same manner as the web page. The virtual screenshot is displayed with overlaid objects, on the local device, in a video stream of screenshots sent from the browser app to a display module of the browser frames.

19 Claims, 5 Drawing Sheets

LOCAL BROWSER ISOLATION WITH VIDEO STREAMING TO PREVENT MALICIOUS ATTACKS

FIELD OF THE INVENTION

The invention relates generally to computer networks, and more specifically, to local browser isolation with video streaming to prevent malicious attacks.

BACKGROUND

Browser isolation generally separates out execution of web browser software. By separating execution, vulnerabilities to malware attacks are also separated. Web requests are executed in proxy by a server and then results deemed safe are downloaded to a client.

However, centralized browser isolation utilizes a lot of CPU power to rewrite and send the browsing data. Web browser is also slower due to an extra network hop uplink and downlink.

What is needed is a robust technique for local browser isolation with video streaming to prevent malicious attacks.

SUMMARY

To meet the above-described needs, methods, computer program products, and systems for local browser isolation with video streaming to prevent malicious attacks.

In one embodiment, a web browser app is configured in a web browser to execute web pages in a virtual machine isolated from the local device, and subject to configured security policies.

In another embodiment, a web page is fetched from the data communication network and load to the virtual machine of the web browser app. The web page continuously renders the web page in the virtual machine of the web browser app according to the configured security policies.

In still another embodiment, a virtual screenshot module to continuously take virtual screenshots of the web page rendering, from the web browser app. Interactive objects are identified on the rendered web page, and replica interactive objects generated to overlay the virtual screenshot to allow user interactions with the screenshot in the same manner as the web page. The virtual screenshot is displayed with overlaid objects, on the local device, in a video stream of screenshots sent from the browser app to a display module of the browser frames.

Advantageously, computer performance is improved and computer networking is improved with better protection from malicious activity.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for local browser isolation with video streaming to prevent malicious attacks from the web. One of ordinary skill in the art will recognize many alternative embodiments that are not explicitly listed based on the following disclosure.

Figure 2:
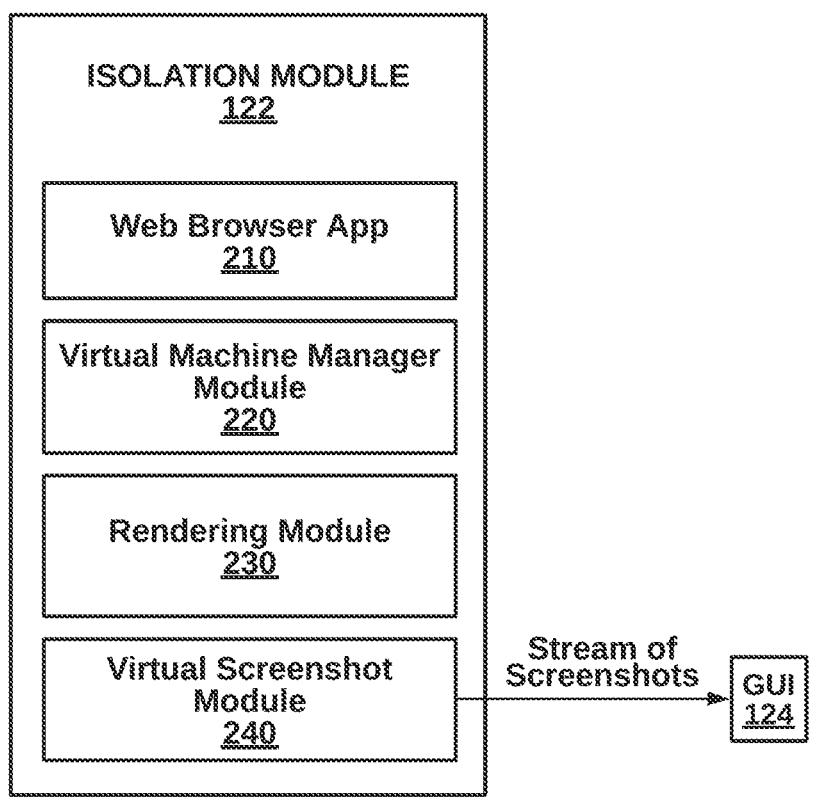
FIG. 2 is a more detailed block diagram illustrating a network device having a web browser, of the system of FIG. 1, according to one embodiment.
Figure 3:
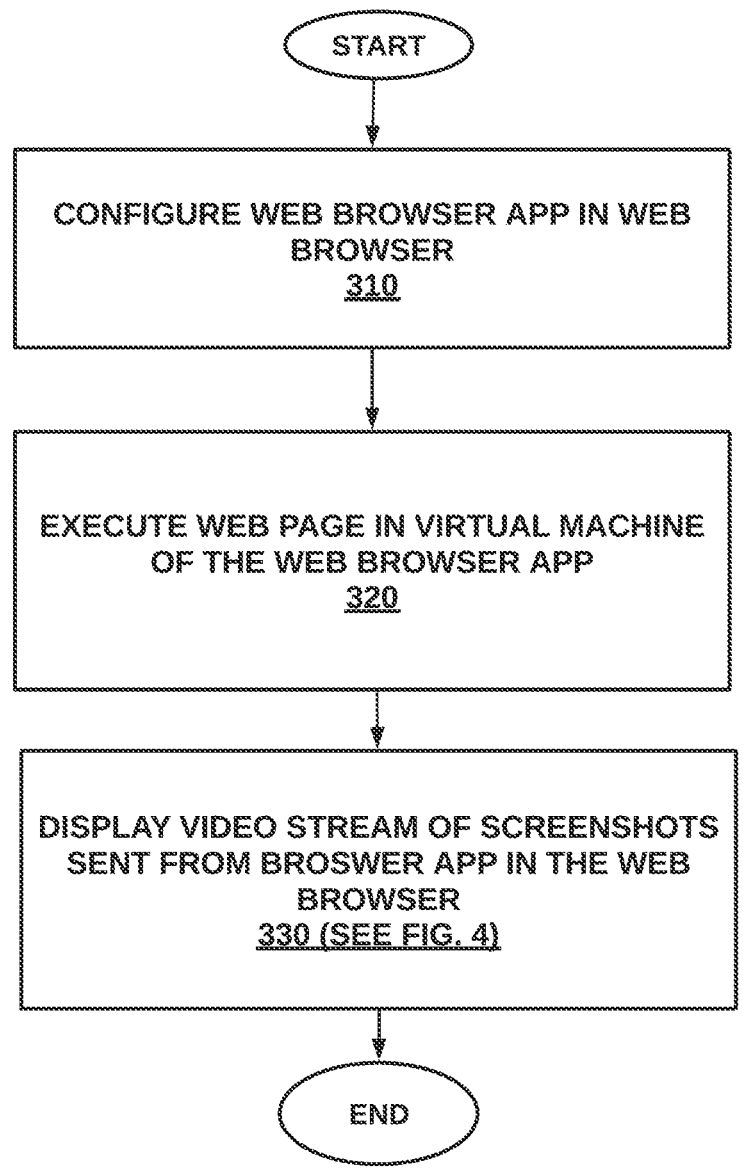
FIG. 3 is a high-level flow chart for local browser isolation with video streaming to prevent malicious attacks, according to an embodiment.

I. Network Systems for Local Browser Isolation with Video Streaming (FIGS. 1-3)

Figure 1:
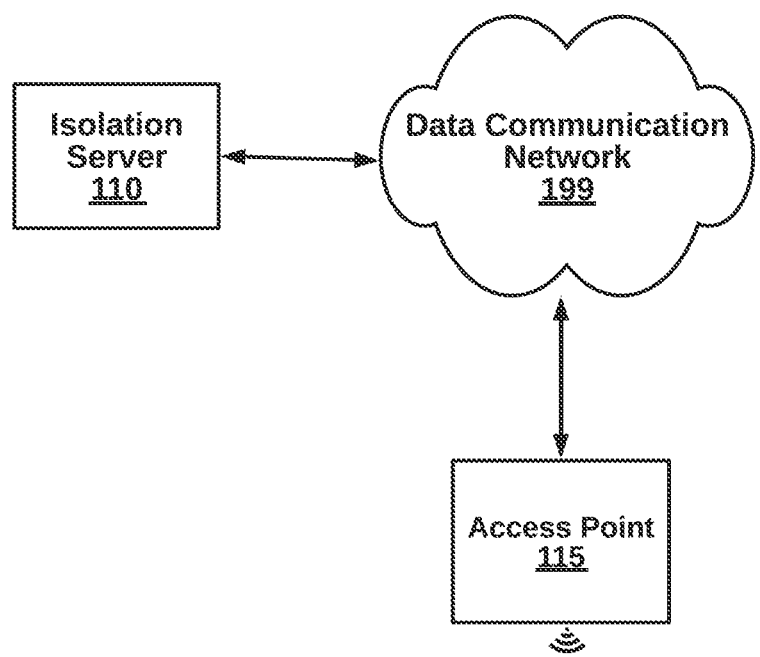
FIG. 1 is a high-level block diagram illustrating a network system for local browser isolation with video streaming to prevent malicious attacks, according to one embodiment.
Figure 1:
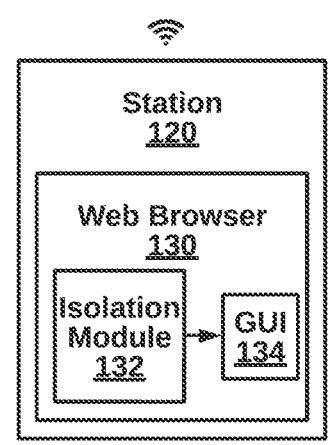

FIG. 1 is a high-level block diagram illustrating a network system 100 for local browser isolation with video streaming to prevent malicious attacks, according to one embodiment. The network system 100 includes an isolation server 110 and station 120 in communication through an access point 115. Other embodiments of the system 100 can include additional components that are not shown in FIG. 1, such as controllers, firewalls, access points, routers, switches, and additional wired or wireless stations. For example, a network gateway can sit in the data path between the isolation server 110 and the station 120. Many variations are possible. The components are implemented in hardware, software, or a combination of both, as shown in the example below of FIG. 6.

The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPv4 or IPV6 address spaces. The isolation server 110 can be coupled to a data communication network 199 such as a private network that is in turn connected to the Internet. The access point 115 can be connected to the data communication network 199 both via hard wire (e.g., Ethernet). The station 130 can be indirectly connected to the data communication network 199 via wireless (or wired) networking.

The isolation server 110 centrally administers local browser isolation. A network administrator can log in to a user interface for configuring policies for isolation behavior across an enterprise. New malicious behavior can be identified and updated remediation policies distributed to local LANs to address the new behavior. This cloud-based embodiment can be operated by a third-party as a service to many different clients on local LANs. In another embodiment, the isolation server 110 is located behind a firewall within an enterprise network for private use. The isolation server 110 can interact directly with web browser apps.

The station 120 includes a web browser 130 with an isolation module 122 to partition execution of web pages and sending a video stream of web pages for display to a user on GUI 134. The web browser 132 can be Google Chrome, Apple Safari, Firefox, Microsoft Edge, or any other application with web browsing. Processing tasks can be offloaded and performed cooperatively between the isolation server 110 and the isolation module 132. In other embodiments, the web browser 130 operates independently of any central control. The isolation module 132 can be downloaded and installed as a web browser add-on or patch. In one case, the isolation modules 132 use the operating system for device profiling, and then automatically downloads policies from the isolation server 110 corresponding to the device profiles.

In one embodiment, the isolation module 132 is implemented using WebAssembly or WASM, as defined by the World Wide Web Consortium (W3C). Generally, WASM provides a way to run code written in multiple languages (e.g., C/C++, Rust or AssbemblyScript) on the web at near native speed. In another embodiment, JavaScript, HTML, XML, or some other language capable of running virtual machines, or combination of languages, is utilized. The isolation modules 140A-C keep any malicious attacks contained because only a video stream exists the virtual machine environment. Additional details of the stations 120A-C are set forth below with respect to FIG. 2.

FIG. 2 is a more detailed block diagram illustrating the isolation module 122 of FIG. 1, according to an embodiment.

The isolation module 122 is self-contained (e.g., WASM) with respect to running apps within the web browser 120 and further comprises a web browser app 210, a virtual machine manager module 220, a rendering module 230 and a virtual screenshot module 240.

The web browser app 210 fetches a web page from the data communication network using a URL or otherwise. The returned data is loaded into the virtual machine of the web browser app. The web browser app 210 executes web pages in a virtual machine isolated from the local device. The configured security policies are applied. In one case the web browser 120 matches the web browser app 210 (e.g., Chrome running Chrome). In another case, the web browser 120 runs a different web browser app 210.

The virtual machine manager module 220 can distribute a pool of virtual machines as a resource pool. The web browser app 210 and other apps can request use and be subject to permissions. Many other apps can also run web data in this manner, such as audio players, video games, chats, and the like.

The rendering module 230 can continuously render the web page in the virtual machine of the web browser app according to the configured security policies. The rendering, although for a virtual output, can be the same as rendering for output on a physical monitor. In some cases, rendering can be optimized for the virtual output, for example, by eliminating unnecessary functions.

The virtual screenshot module 240 can continuously take virtual screenshots of the web page rendering, from the web browser app. In general, a screenshot captures what is displayed to a user through a monitor. A rate of screenshots is preferably 24 or 30 frames per second, for example, but many other rates can be used. The output can be mp4 or some other video format. In one option, an object overlay module identifies interactive objects on the rendered web page. Replica interactive objects are then generated to overlay the virtual screenshot to allow user interactions with the screenshot in the same manner as the web page. For example, a menu of rectangle buttons can be identified in source code or by visual recognition, and an action (or actions) connected to selecting the button are determined. There can also be drop down menus, radio buttons, forms to fill out, and other types of input.

The virtual screenshot module 240 streams to the GUI 124. The GUI 124 can be a standard web browser GUI that displays agnostically, unaware of preprocessing or content. The GUI 124 can include element such as a web page address bar, a short cut bar, web browser controls and a content display block. In one implementation, the output is embodied in a frame of a web browser. In another implementation, the output is embodied in a video player.

II. Methods for Local Browser Isolation with Video Streaming (FIGS. 4-5)

Figure 4:
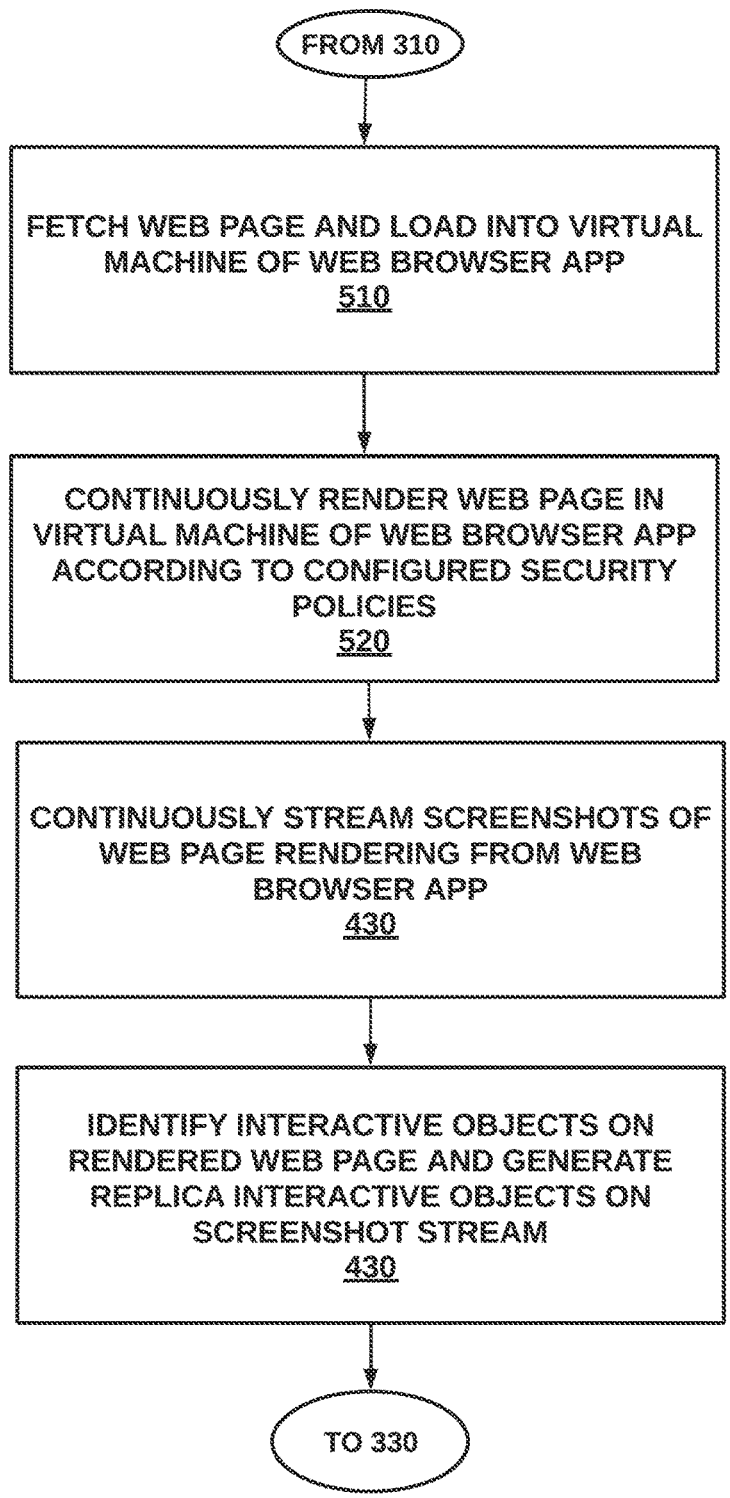
FIG. 4 is a more detailed flow chart for a step of displaying content from browser isolation, from the method of FIG. 3, according to one embodiment.
Figure 5:
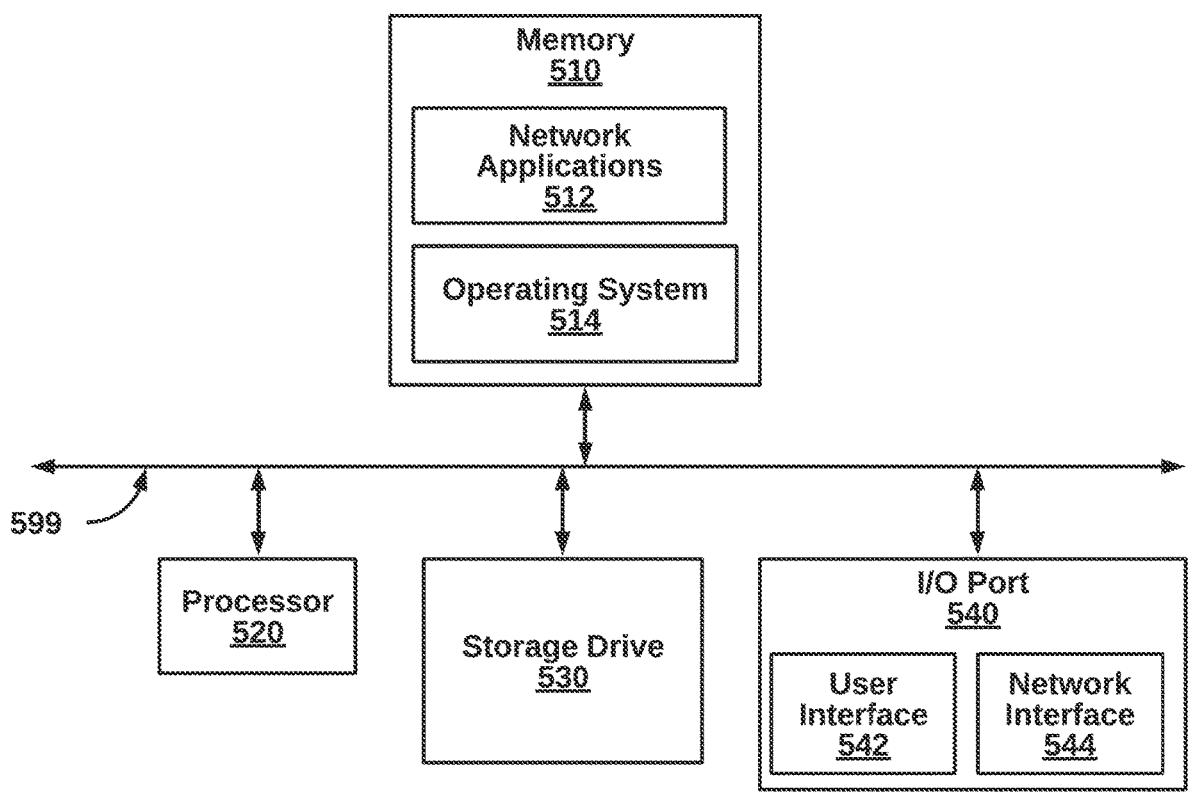
FIG. 5 is a block diagram illustrating an example computing device implementing the network system of FIG. 1, according to one embodiment.

FIG. 4 is a high-level flow diagram illustrating a method 400 for local browser isolation with video streaming to prevent malicious attacks. The method 400 can be implemented by, for example, system 100 of FIG. 1.

At step 410, a web browser app is configured in a web browser. At step 420, web pages are executed in a virtual machine of the web browser app, as explained in more detail below. Configured security policies are applied within the virtual machine environment. At step 430 displaying a video stream of screenshots sent from the browser app to a display module of the browser.

A more detailed example of step 420 for streaming web pages, is shown in FIG. 4, according to one embodiment. At step 510 a web page is fetched from the data communication network and loaded into the virtual machine of the web browser app. At step 520, the web page is continuously rendered in the virtual machine of the web browser app according to the configured security policies. At step 530, the web page rendering is continuously screenshot from the web browser app. At step 540, interactive objects are identified on the rendered web page. Replica interactive objects are generated to overlay the virtual screenshot to allow user interactions with the screenshot in the same manner as the web page.

III. Computing Device for Local Browser Isolation with Video Streaming (FIG. 6)

FIG. 6 is a block diagram illustrating a computing device 600 implementing the packet processor 100 of FIG. 1, according to one embodiment. The computing device 600 is a non-limiting example device for implementing each of the components of the system 100, including the isolation server 110 and the stations 120A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like.

Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a web browser of a network device, for local browser isolation with video streaming to prevent malicious attacks, the method comprising the steps:

configuring a web browser app in the web browser to execute web pages in a virtual machine isolated from the local device, and subject to configured security policies;

fetching a web page from the data communication network and loading to the virtual machine of the web browser app;

continuously rendering the web page in the virtual machine of the web browser app according to the configured security policies;

continuously virtual screenshotting the web page rendering, from the web browser app;

identifying interactive objects on the rendered web page, and generating replica interactive objects overlaying the virtual screenshot to allow user interactions with the screenshot in the same manner as the web page;

displaying the virtual screenshot with overlaid objects, on the local device, in a video stream of screenshots sent from the browser app to a display module of the browser.

2. The method of claim 1, wherein the web browser app comprises a mini web browser.

3. The method of claim 1, wherein the browser app executes a plurality of virtual machines, having a dedicated virtual machine for each opened browser tab.

4. The method of claim 1, further including:
receiving an input from a user based on a user interaction with an input/output field of the video stream, and sending the input to the virtual machine for execution.

5. The method of claim 1, wherein data packets received from the external network are processed within the virtual machine.

6. The method of claim 1, wherein the web browser app runs in a sandbox environment.

7. The method of claim 1, wherein the web browser app runs over WebAssembly.

8. The method of claim 1, wherein the web browser app receives updated policies.

9. The method of claim 1, wherein, responsive to a trigger, the web browser app is bypassed and data is processed directly by the web browser.

10. A non-transitory computer-readable medium storing computer-readable instructions in a web browser on a network device on a data communication network, that when executed by a processor, perform a method for local browser isolation with video streaming to prevent malicious attacks, the method comprising:
configuring a web browser app in the web browser to execute web pages in a virtual machine isolated from the local device, and subject to configured security policies;
fetching a web page from the data communication network and loading to the virtual machine of the web browser app;
continuously rendering the web page in the virtual machine of the web browser app according to the configured security policies;
continuously virtual screenshotting the web page rendering, from the web browser app;
identifying interactive objects on the rendered web page, and generating replica interactive objects overlaying the virtual screenshot to allow user interactions with the screenshot in the same manner as the web page;
displaying the virtual screenshot with overlaid objects, on the local device, in a video stream of screenshots sent from the browser app to a display module of the browser.

11. The method of claim 10, wherein the web browser app comprises a mini web browser.

12. The method of claim 10, wherein the browser app executes a plurality of virtual machines, having a dedicated virtual machine for each opened browser tab.

13. The method of claim 10, further including:
receiving an input from a user based on a user interaction with an input/output field of the video stream, and sending the input to the virtual machine for execution.

14. The method of claim 10, wherein data packets received from the external network are processed within the virtual machine.

15. The method of claim 10, wherein the web browser app runs in a sandbox environment.

16. The method of claim 10, wherein the web browser app runs over WebAssembly.

17. The method of claim 10, wherein the web browser app receives updated policies.

18. The method of claim 10, wherein, responsive to a trigger, the web browser app is bypassed and data is processed directly by the web browser.

19. A web browser on a network device on a data communication network, for local browser isolation with video streaming to prevent malicious attacks, the web browser comprising:
a processor;
a network communication module, communicatively coupled to the processor and to the data communication network; and
a memory, communicatively coupled to the processor and storing:
an operating system module to configure a web browser app in the web browser to execute web pages in a virtual machine isolated from the local device, and subject to configured security policies;
a web request module to fetch a web page from the data communication network and load to the virtual machine of the web browser app;
a rendering module to continuously render the web page in the virtual machine of the web browser app according to the configured security policies;
a virtual screenshot module to continuously take virtual screenshots of the web page rendering, from the web browser app;
an object overlay module to identify interactive objects on the rendered web page, and generate replica interactive objects overlaying the virtual screenshot to allow user interactions with the screenshot in the same manner as the web page;
a display module to display the virtual screenshot with overlaid objects, on the local device, in a video stream of screenshots sent from the browser app to a display module of the browser frames.

* * * * *